United States Patent [19]

Dreyfus et al.

[11] 4,226,536
[45] Oct. 7, 1980

[54] ELECTRO-OPTICAL CONTOUR MEASURING SYSTEM

[76] Inventors: Marc G. Dreyfus, 4 Arnold St., Old Greenwich, Conn. 06870; Arnold Pellman, 30 Colony Ct., Stamford, Conn. 06905

[21] Appl. No.: 14,855

[22] Filed: Feb. 23, 1979

[51] Int. Cl.³ .............................................. G01B 11/24
[52] U.S. Cl. ..................................... 356/376; 250/224
[58] Field of Search ............................... 356/375–376, 356/371, 378, 1; 250/224

[56] References Cited

U.S. PATENT DOCUMENTS

| 3,016,464 | 1/1962 | Bailey | 356/375 |
|---|---|---|---|
| 3,180,205 | 4/1965 | Heppe et al. | 358/107 |
| 3,187,185 | 6/1965 | Milnes | 356/3 |
| 3,227,036 | 1/1966 | Golay | 356/323 |
| 3,481,672 | 12/1969 | Zoot | 356/5 |
| 3,633,010 | 1/1972 | Svetlichny | 356/1 |
| 3,749,501 | 7/1973 | Wieg | 356/375 |
| 3,802,774 | 4/1974 | Eschler et al. | 356/4 |
| 3,927,948 | 12/1975 | Cox et al. | 356/375 |
| 3,986,774 | 10/1976 | Lowrey, Jr. et al. | 356/3 |
| 4,025,198 | 5/1977 | Hutchins | 356/390 |
| 4,053,227 | 10/1977 | Bodlaj | 356/4 |
| 4,146,926 | 3/1979 | Clerbet | 364/556 |
| 4,147,433 | 4/1979 | Drinkuth | 356/390 |

FOREIGN PATENT DOCUMENTS 2625489 5/1977 Fed. Rep. of Germany ............ 356/371
2811250 2/1979 Fed. Rep. of Germany ............ 356/376

Primary Examiner—John K. Corbin
Assistant Examiner—Wm. H. Punter
Attorney, Agent, or Firm—Michael Ebert

[57] ABSTRACT

A non-contacting, electro-optical system adapted automatically to measure the contours of helicopter rotor blades and other shaped objects at high speed and with a high degree of accuracy. An object to be measured is held in a fixture with its contoured surface presented to an electro-optical triangulation rangefinder assembly supported on a carriage that is caused to step incrementally from one end of the object to the other. The assembly is constituted by a pivoted laser beam illuminator and a pivoted automatic tracker mounted for rotation at spaced pivot points on a carriage beam, the line extending between these points forming a triangulation baseline. At each carriage step, the assembly is activated to cause the illuminator to swing through a sector whereby the laser beam spot scans across the surface of the object being tested from one edge to the other. The angles assumed by the illuminator and those assumed by the tracker in the course of a scan are determined and fed to a computer in which the value of the baseline is stored, the computer calculating the changing spot location by triangulation. This scanning operation is repeated at every step from one end of the object to the other, thereby mapping the entire contour of the surface.

12 Claims, 6 Drawing Figures

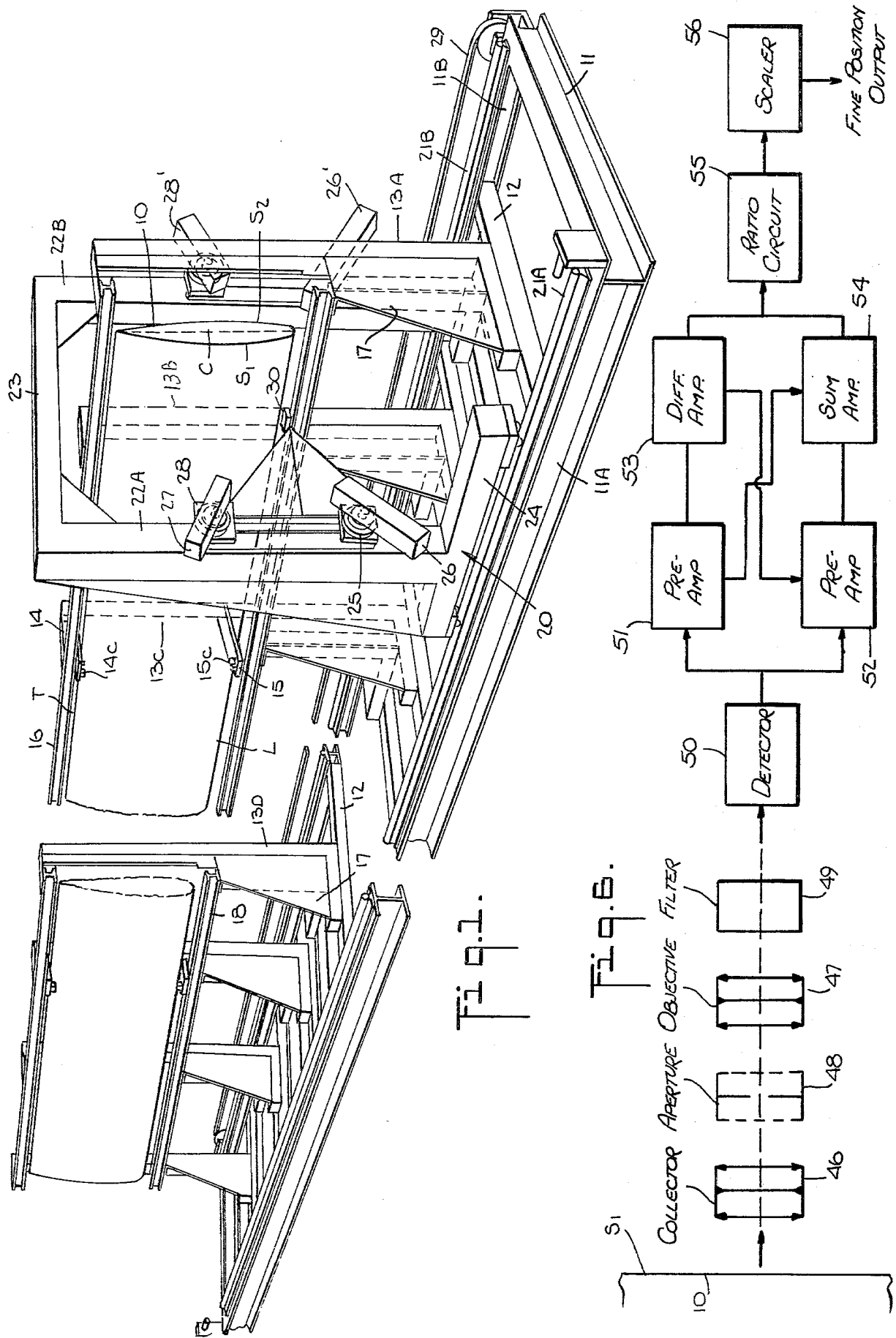

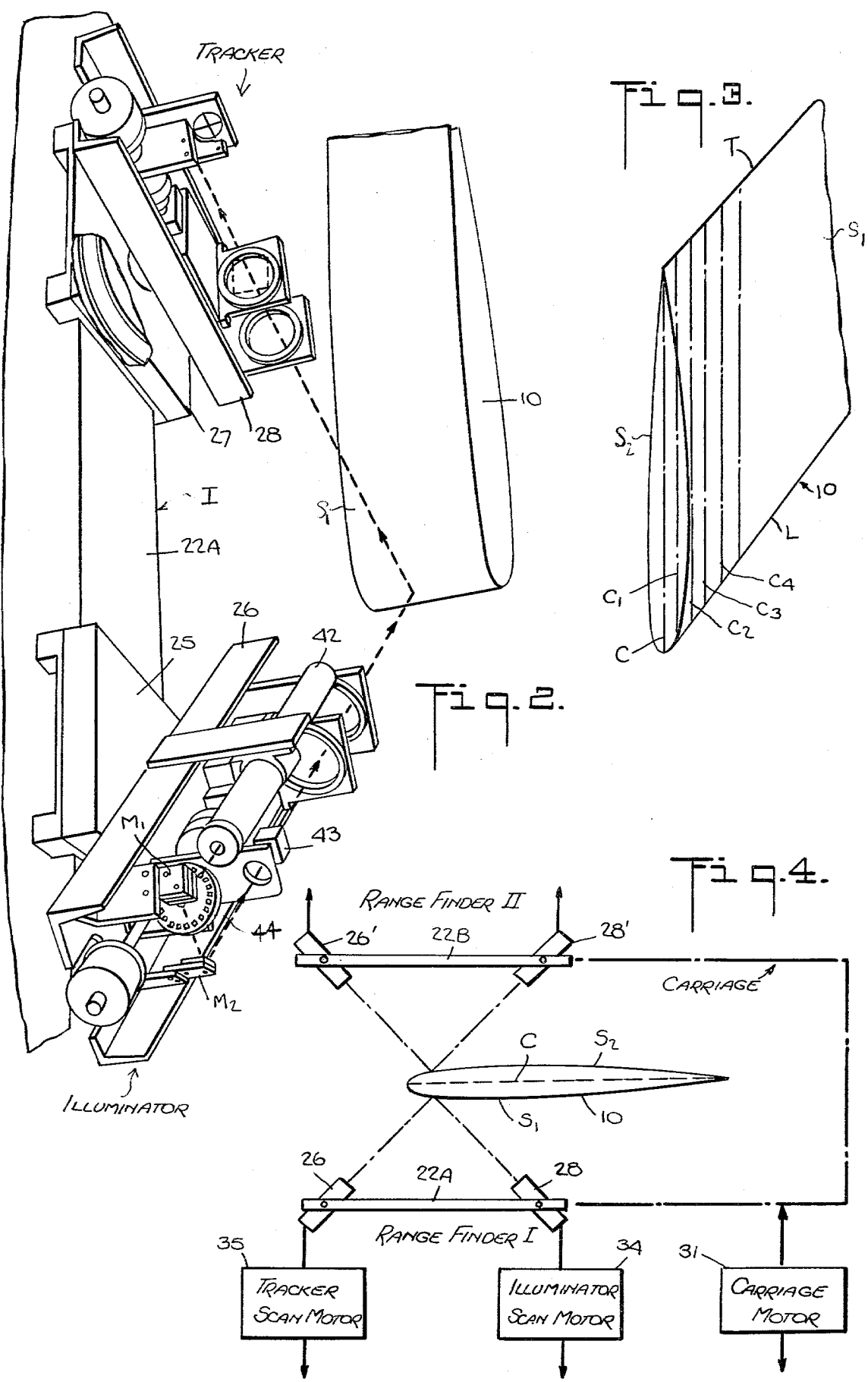

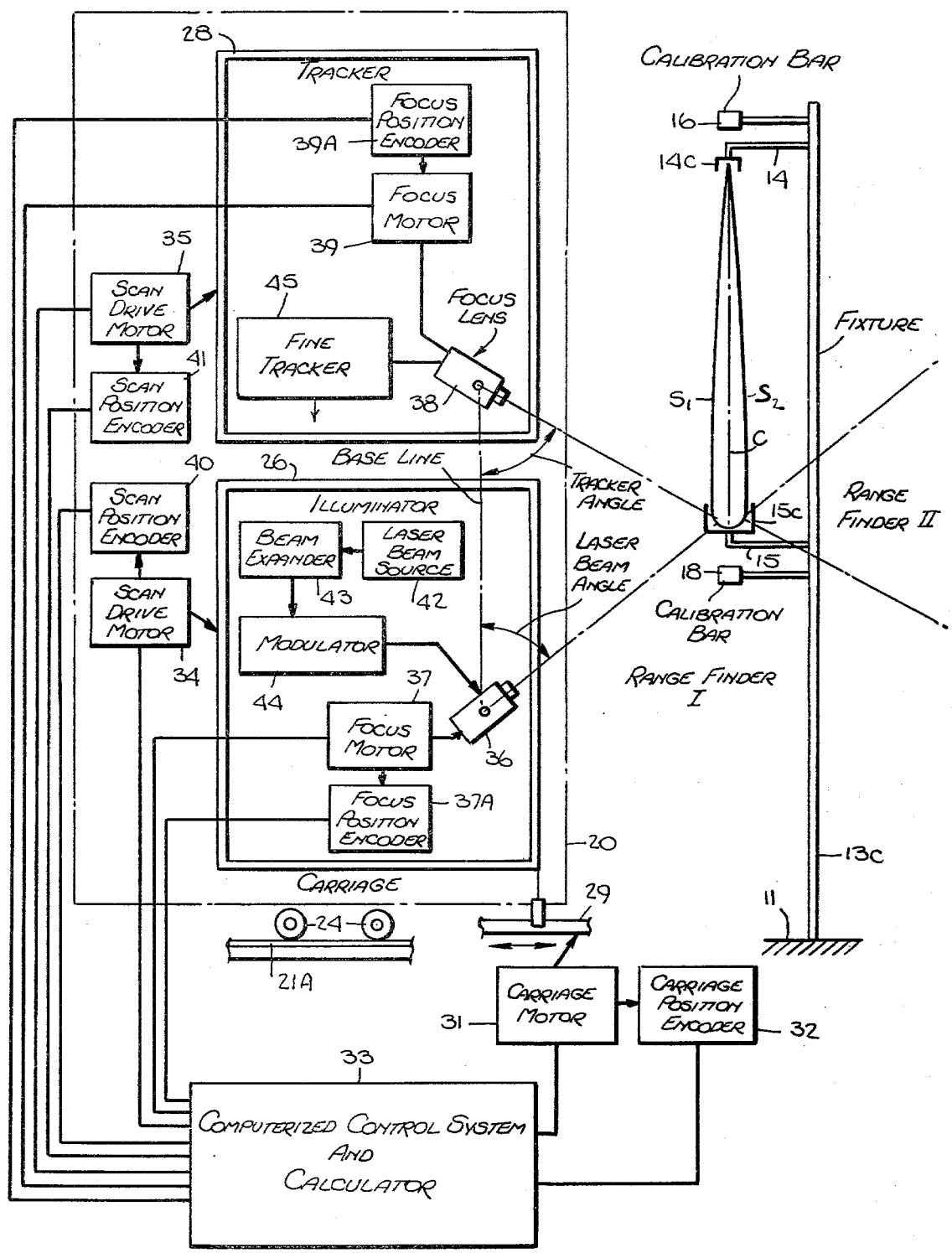

ELECTRO-OPTICAL CONTOUR MEASURING SYSTEM

BACKGROUND OF THE INVENTION

1. Field of Invention

This invention relates generally to a non-contacting, electro-optical measuring system for mapping the contoured surface of an object being tested, such as the contour of a helicopter rotor blade, and more particularly to a system of this type which makes use of an electro-optical triangulation rangefinder assembly to effect accurate and rapid contour measurements.

2. Prior Art

Though the invention is applicable to contour measurement of any three-dimensional surface without making contact with the surface being measured, we shall for purposes of explanation describe the invention in connection with contour measurement of helicopter rotor blade surfaces. Such blades are relatively massive and present particular problems which are solved by the present invention.

The performance of a helicopter and its operating life are greatly affected by the extent to which the rotor blades adhere to predetermined contour design requirements. If the manufactured blade deviates significantly therefrom the rotating blade is subject to vibration which not only degrades the performance of the vehicle in flight, but also reduces the life of the blade and the gear box associated therewith.

The manufacture of many precision parts such as instrumentation components and various shaped turbine and propeller blades, entails close control of and the ability to determine the contour of various surfaces on these parts. Conventional gauging systems for this purpose make use of contact probes that physically engage the surface under observation to carry out the required contour measurement. To a large degree, the accuracy of these measurements depends upon the stability of the mechanical structure which serves as a reference, for any twisting, bending or settling of the structure that takes place after the measuring gauge is calibrated or in the course of measurement will adversely affect the accuracy of the reading.

When the object being measured is a helicopter blade, contact probes must cover over 40 feet in the span direction and 48 inches in the chord direction with a position accuracy of better than plus or minus 0.001 inches under normal shop conditions. The cost and complexity of a mechanical X-Y carriage for orienting a contour measuring probe with this order of accuracy is exceptionally high. If multiprobes are used, the relative position of one to the other must be known and held to better than plus or minus 0.001 inches. This too is very expensive to realize in practice. Moreover, contact probes are subject to wear and must be replaced at fairly frequent intervals.

Another practical drawback of conventional contact-type contour gauging systems is that they afford little, if any, flexibility in operation. Once the probes are positioned for a certain type of blade, before any other blade configuration can be measured, a costly probe rearrangement is entailed.

To effect contour mapping of shaped objects, it is also known to use non-contact, electro-optical systems such as those described in the Waters U.S. Pat. No. 3,909,131; the Lowrey et al. U.S. Pat. No. 3,986,774; the Erb U.S. Pat. No. 3,671,126 and the Zoot et al. U.S. Pat. No. 3,679,307. These prior patents describe electro-optical techniques for surface gauging and represent non-contacting optical concepts predicated on geometrical relationships between a source of radiation and a detector.

The above-identified Waters patent is of particular interest; for the invention disclosed in this patent is based on the principle that as a focused spot of radiation from a laser source is moved in discrete increments across the surface being gauged, contour variations can be measured by triangulation, this being accomplished by electronically following the position of an image of the spot on a detector array. Two modes of operation are disclosed by Waters. In one mode, the object being tested is translated until the imaged spot is driven through a null position. In the other mode, it is the detector that is translated relative to the object.

In a non-contacting system of the Waters type operating in the mode in which the contoured object is physically displaced with respect to the triangulation system, this translation results in shifting masses which act to flex and distort the system, thereby giving rise to significant measurement errors, particularly when contour mapping large surfaces such as helicopter rotor blades.

Alternately, when Waters translates his detector, this translation generates optical and mechanical errors in rotational angle which are difficult to calibrate or control. These drawbacks are acknowledged by Waters who recommends object translation as "a superior operational mode from an accuracy consideration" (column 7, lines 24 and 25).

Also of interest are the following prior art patents relating to non-contact electro-optical measuring systems: Nordqvist, U.S. Pat. No. 3,655,990; Foster et al., U.S. Pat. No. 3,858,983; Zanoni, U.S. Pat. No. 3,768,910; Zanoni, U.S. Pat. No. 3,847,485 and Zanoni, U.S. Pat. No. 3,907,439.

SUMMARY OF INVENTION

In view of the foregoing, the primary object of the present invention is to provide a low-cost and relatively simple non-contacting electro-optical system adapted to automatically measure the surface contours of helicopter rotor blades and other shaped objects, which measurement is carried out at high speed and with a high order of accuracy.

More particularly, an object of this invention is to provide a system of the above type in which a contoured surface is mapped by means of an electro-optical rangefinder assembly operating on the triangulation principle, the assembly being mounted on a carriage that is movable in a stepwise manner with respect to an object being measured which is fixedly held at a stable position by a fixture.

Also an object of the invention is to provide a carriage-mounted rangefinder assembly constituted by a pivoted laser beam illuminator and a pivoted automatic tracker mounted for rotation at spaced pivot points on a carriage beam, the line extending between points forming a triangulation baseline. The major variables are the two measured angles, one between the optical axis of the illuminator and the baseline, and the other between the optical axis of the tracker and the baseline.

An important aspect of the invention resides in the fact that the illuminator and tracker are balanced so that their centers of gravity lie on their axes of rotation. As a consequence, one encounters no mechanical distortion of the contour measuring system due to shifting mass centroids as the illuminator and tracker are rotated.

A salient feature of a system according to the invention is that it is capable of functioning in a factory or engineering environment to perform contour measurement on relatively large and massive objects such as helicopter blades, with a speed and accuracy that represents a notable advance over prior techniques. Another advantage of the invention is its inherent flexibility; for the same system may be used to effect contour measurement of different types of blades without rearrangement—for all that is required when a different type of blade is to be automatically contour-measured is operator control or software reprogramming.

Still another object of the invention is to provide a noncontact electro-optical automatic contouring system in which flexure and distortion in the translating carriage structure supporting the rangefinder assembly is corrected by means of straight calibration bars whose mountings are mechanically independent of the rangefinder. The mechanical structure of the present system is less elaborate and costly than structures heretofore required, in that the requirements for dimensional stability are reduced to a considerable degree due to the self-calibration feature.

Yet another object of the invention is to provide a two-stage tracker angle readout in which the tracker angle used in calculating the contour is the algebraic sum of an angle measured electromechanically over an angular range of ±30° to an accuracy of one second and an angle measured electro-optically over an angular range of ±0.1° to an accuracy of one second, thereby affording both fine and coarse measurements.

Briefly stated, in a system in accordance with the invention when arranged to effect contour measurement of a helicopter rotor blade, the blade is supported in a stable position by a fixture which holds the blade with its leading and trailing edges placed between upper and lower flat calibration bars.

In order to carry out contour-measurement concurrently on both contoured sides of the fixture-supported helicopter blade, a gantry-like carriage is provided which rides on rails that straddle the fixture, the carriage including a pair of vertical beams on opposing sides of the blade and equi-spaced from the chord thereof.

Supported at corresponding positions on these beams are two like rangefinder assemblies, each assembly being constituted by a pivoted laser beam illuminator and a pivoted automatic tracker mounted for rotation on the associated beam on spaced pivot points, the line extending between the pivot points representing a triangulation baseline. The illuminator and tracker are each counterbalanced to maintain fixed centroids.

The carriage is caused to step incrementally along the rails from one end of the blade to the other. At each carriage step, the rangefinder assemblies are both activated, to cause each illuminator to swing through a sector whereby the laser beam spot impinging on the blade scans across the related surface from the leading to the trailing edge thereof. Means associated with each assembly act to determine the changing angles assumed by the illuminator and those assumed by the tracker in the course of a scan, these angular values being fed to a computer in which the baseline value is stored, the computer calculating the changing location of the spot by triangulation.

This scanning operation, which takes place simultaneously on both sides of the blade, is repeated at every carriage step from one end of the object to the other, thereby mapping the entire contour of both surfaces. At the beginning and end of each contour scan, the rangefinder assemblies are calibrated by contouring the flat calibration bars located adjacent the leading and trailing edges of the blades, so as to introduce a correction factor taking into account any mechanical distortion of the rangefinder position resulting from carriage movement along the rails.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a non-contacting electro-optical contour measuring system in accordance with the invention, the system being arranged to carry out contour mapping of opposing surfaces of a helicopter rotor blade by means of a pair of rangefinder assemblies;

FIG. 2 is an enlarged perspective view of one of the rangefinder assemblies;

FIG. 3 shows a portion of a helicopter rotor blade to be tested;

FIG. 4 is a schematic diagram of the measuring system;

FIG. 5 is a block diagram of the measuring system; and

FIG. 6 is a block diagram of the fine angle tracker.

DETAILED DESCRIPTION OF INVENTION

System Structure

Referring now to FIG. 1, there is shown a fixture for supporting a helicopter rotor blade 10 lengthwise at a stable position suitable for contour mapping by a non-contacting electro-optical measuring system in accordance with the invention, which system includes a pair of triangulation rangefinder assemblies, one for each side of the blade.

Rotor blade 10, by way of example, has a length of 40 feet and a chord of 48 inches. As best seen in FIG. 3, chord C is a straight line joining the leading edge L of blade 10 which has an airfoil shape, to the trailing edge T thereof. The blade possesses contoured front and rear surfaces $S_1$ and $S_2$ whose contours are to be mapped to determine whether they conform to predetermined design requirements and, if not, the extent to which they deviate therefrom.

The fixture for supporting the blade lengthwise is constituted by a frame-shaped bed or base 11 which rests on or is bolted to the floor and is level therewith, the base including a pair of parallel girders 11A and 11B. Placed between these girders and mounted at spaced positions on transverse ties 12 which bridge the girders are a series of uprights 13A, 13B, 13C etc.

Each upright, such as upright 13C, is provided with a pair of spaced upper and lower cantilever arms 14 and 15 whose ends are equipped with clamps 14C and 15C adapted to grip the trailing and leading edges, respectively, of the blade. The number of uprights and their spacing are such as to securely support the blade being tested so that its position is stationary and remains so in the course of testing.

Also supported by the upper cantilever arms 14 of the uprights is a horizontally-extending calibration bar 16 having a narrow flat horizontal edge, the bar extending the full length of the blade. Supported below the lower cantilever arms 15 of the uprights on upright bracket 17 is a horizontally-extending calibration bar 18 also having a similar edge.

Thus the fixture locates the blade between two reference bars which establish the coordinate system for contour measurement. In practice, therefore, the means to position the electro-optical rangefinder need not be controlled, say, to plus or minus 0.001 inches relative to the rotor blade, the only requirement being that its position be known to plus or minus 0.001 inches as determined by scanning the reference bars.

Since the series of uprights optically obscure side $S_2$ of the blade, the uprights are made in a narrow width consistent with structural requirements to minimize this effect and to maximize the exposure of side $S_2$ to the electro-optical rangefinder which scans this side.

In practice, base 11 may be made in girder sections of suitable stock length, so that the base is readily transportable and can be installed without difficulty. Standard couplers are used to join the girder section together, means being also provided for levelling the entire length of the base.

The optical sensor of the contour measuring system requires a transporting mechanism which moves the sensor spanwise along the blade being measured. This transporting mechanism is constituted by a gantry-type carriage, generally designated by numeral 20, which rides on a pair of rails 21A and 21B resting on base girders 11A and 11B.

Carriage 20 includes a pair of parallel vertical beams 22A and 22B whose top ends are bridged by a cross beam 23, the lower end of beam 22A being joined to a two-wheel truck 24 riding on rail 21A. The lower end of beam 22B is joined to a single wheel truck (not shown) which rides on rail 21B, thereby providing a stable, three-point suspension.

The length of the fixture base and of the rails thereon are at least 50 feet so that carriage 20 can travel beyond and clear the 40-foot length rotor blade held on the fixture at either end of the blade to a degree sufficient to allow loading and unloading of blades to be tested.

As best seen in FIG. 2, pivotally mounted on a pad 25 secured to vertical beam 22A is a first rangefinder assembly I including laser beam illuminator 26 which is rotatable through sufficient angles to scan the surface $S_1$ for the entire chord C; that is, from the leading to the trailing edge of the blade. Pivotally mounted on a pad 27 secured to beam 22A at a position above that of pad 25 is a tracker 28 which is rotatable through sufficient angles to intercept the illuminator beam reflected from surface $S_1$ of the blade. The straight line extending between the pivot point or axis of illuminator 26 and the pivot point of tracker 28 represents the baseline of the triangulation rangefinder. In one practical embodiment, this baseline is 40 inches long.

Laser beam illuminator 26 preferably generates a 0.001 inch by 0.100 inch line image on the surface of the rotor blade, which image is hereafter referred to as the laser beam spot. In operation, illuminator 26 is rotated about its pivot axis; and as the illuminator swings, the spot travels along the surface in the chord direction. Tracker 28 captures the beam reflected from the spot position in its field of view and tracks it as it travels across the chord.

The structure of the illuminator and the structure of the tracker are both counterbalanced to minimize shifting of masses on the supporting frame of the measuring equipment, thereby improving measuring accuracy and reducing the cost and complexity of the supporting frame. By counterbalancing is meant that the structure of the tracker and that of the illuminator have a fixed mass distribution such that they are balanced in the inactive state with respect to either side of the center of gravity. There are only two small masses which shift in the course of operation, these being one focusing lens in the illuminator which is motor-driven, and one in the tracker which is motor-driven. These masses shift only a few inches while making measurements and are continuously counterbalanced, so that there is no net shift.

Mounted on beam 22B at positions corresponding to illuminator 26 and tracker 28 of the first rangefinder assembly I is a second and identical rangefinder assembly II for contour-measuring the $S_2$ side of the blade. The second assembly is constituted by a pivotally-mounted laser beam illuminator $26b'$ and a tracker $28'$ whose structure and function are the same as those of illuminator 26 and tracker 28 of the first assembly.

Carriage 20 is motor-driven, as by means of an endless belt 29 operatively coupled to beam 21B, to advance the carriage and the rangefinder assemblies borne thereby in incremental steps from one end of the blade being measured to the other. When the carriage occupies a given step, a scanning action is carried out concurrently on opposing sides of the blade by rangefinders I and II to determine the contours of the blade sides.

Thus, as shown in FIG. 3, at the first step, chord C is scanned at one end of blade 10, then the carriage is incrementally advanced, and at the next step Chord $C_1$ is scanned, this being repeated at chord $C_2$ and so on until the chord at the other end of the blade is reached and both sides of the blades are contour mapped.

Because the leading edge L of the air-foil shaped blade has a bullet-nosed formation and is inaccessible to the tracker, it cannot directly view the surface thereof. To facilitate tracking of the leading edge, a mirror 30 is fixed to the rangefinder assembly at a position below the leading edge L of the blade. The mirror is oriented to intercept the line-of-sight of the tracker and to redirect it to the leading edge of the blade. The mirror is positioned so that the area around the leading edge is fully visible to the tracker, starting from the area where the chordal plane intersects the rotor surface, and extending back along the rotor surface to the area which is directly visible to the tracker without the use of the mirror.

The location of the mirror surface must be determined relative to the triangulation rangefinder, in order to make contour measurements by tracking through the mirror, and in order to relate these contour measurements to those made by tracking the rotor surface directly. A preferred method for determining the mirror surface location uses illuminator angle and tracker angle measurements made on two points on the rotor surface which are visible to the tracker both directly and through the mirror. The unique mirror position which is consistent with these four pairs of angle measurements can then be determined by standard algebraic methods.

Alternatively, a mirror can be used to redirect the flux from the illuminator onto the rotor surface, without deflecting the tracker's line of sight. Two or more mirrors may be used for access to curved surfaces which are not directly visible to either the illuminator or the tracker.

System Operation

Referring now to FIGS. 4 and 5, it will be seen that rangefinder assemblies I and II of the contour measuring system are borne by means 22A and 22B, each assembly having an illuminator and a tracker in operative relation to a respective side of rotor blade 10. Since the two assemblies are identical, only the motors and other devices associated with rangefinder assembly I will be described in this section.

The incremental stepping of carriage 20 to advance the rangefinder assemblies through successive chords C, $C_1$, $C_2$ etc. from the front end to the rear end of the blade 10 being tested is effected by a carriage stepping motor 31 which drives belt 29. Motor 31 operates in conjunction with an encoder 32 that provides a signal indicative of the carriage step position. This signal is supplied to a computer 33 which governs the operation of the system and also acts in response to signals supplied thereto by the rangefinder assemblies to carry out computations based on the sensed values in order to effect measurements by triangulation.

In practice, computer 33 may be a general purpose microcomputer with sufficient speed and memory to handle all of the control functions of the contour measurement system as well as the necessary computational and report-generating functions. Use may be made of a dual floppy-disc system which is associated with the microcomputer to provide ample nonvolatile storage for measurement programs, blade specification data and general purpose utility programs. Two independent disc drivers are supplied so that discs may be copied for back-up to lessen the risk of downtime due to hardware failure.

The angular position of illuminator 26 of rangefinder assembly I is controlled by a scan motor 34 and that of automatic tracker 28 by a scan motor 35 included in a servo system. One form of servo system suitable for automatically controlling a tracker is disclosed in the above-identified Nordqvist patent whose disclosure is incorporated herein.

Illuminator 26 includes a focusing lens 36 controlled by a focus motor 37 whose position is sensed by an encoder 37A. Tracker 28 includes a focusing lens 38 controlled by a focus motor 39 whose position is sensed by an encoder 39A. As the laser illuminator pivots, its beam is maintained in focus on the surface of the rotor blade by a closed-loop control system which acts to focus the output lens of the illuminator, a similar focusing control system being included in the pivoting tracker.

The changing angular position of illuminator 26 in the course of a scan is sensed by an illuminator scan-sensor or encoder 40, and that of the tracker by a tracker scan-sensor or encoder 41. These changing angular values are fed to computer 33 wherein the known value of the baseline is stored. One commercially-available angle sensor suitable for these purposes is sold under the "Inductosyn" trademark.

The length of the baseline varies slightly as the illuminator angle and the tracker angle change. This baseline variation is due to the fact that the optical axes of the illuminator and tracker do not, in general, exactly intersect their corresponding rotation axes, due to constructional tolerances in making and assembling their components.

The illuminator and the tracker could, in principle, be designed incorporating adjustment mechanisms which would permit alignment of their components so that their optical axes would exactly intersect their rotation axes. However, a preferred system design is to measure and record the residual misalignments of these axes during system calibration, and then to calculate the small baseline corrections which are required as part of the data reduction program used in contour measure.

In order to contour the surface, illuminator 26 pivots so that the laser spot travels across that chord (C, $C_1$, $C_2$, $C_3$ etc.) which is in registration with the existing step position at an angular rate of about 3° per second. And as as the illuminator pivots, tracker 28 is caused to swing to track the laser spot under closed loop servo control, this being accomplished in practice to a "coarse" accuracy of 0.050". An open-loop sensor located in the tracker (to be hereinafter described) determines the position of the laser spot to a "fine" accuracy of 0.0005".

As rangefinder assemblies I and II are advanced by the carriage step-by-step to carry out contour measurements on either side of the rotor blade along the full length thereof, the 50-foot long rails on which the carriage travels will tend to settle and twist and thereby slightly alter the rangefinder orientation relative to the blade. To correct for the resultant errors, the rangefinders are calibrated by cotouring the two flat reference bars 16 and 18 adjacent the leading and trailing edges of the blade on the holding fixture. The angular orientation of the pivot axis is monitored by an auto collimator connected rigidly to the pivot axis, the auto collimator looking at a fixed target on the bladeholding fixture.

In practice, the laser illuminator may be constituted by a helium-neon laser source 42 emitting 5 milliwatts of polarized light at 0.6328 micron wavelength in a 0.8 mm diameter beam with a 1 milliradian beam divergence. The resultant light path is folded by flat mirrors $M_1$ and $M_2$ (see FIG. 2) for system compactness, and its diameter is expanded sixty times by an optical beam expander 43 in order to reduce its divergence from 1000 microradians to 25 microradians. In the direction parallel to the span axis, a hundred times larger beam divergence of 2500 microradians is generated by a cylindrical lens incorporated in the beam expander. The expander output is focused on the rotor surface by a servoed objective lens 36 so that it generates a 0.001 inch by 0.100 inch line image.

The use of a spot having a line formation rather than a round formation is useful in contouring rough, somewhat cylindrical surfaces, such as the fiberglass surface of a helicopter rotor blade. To this end, the illuminator beam expander incorporates an anamorphic lens which spreads out the spot of light into a 0.001 × 0.100 inch line parallel to the longitudinal axis of the rotor blade. This lens interacts with the rotor surface to decohere the laser illumination, thereby reducing the tracker's speckle noise to a negligible level. In practice, the amount of light collected by the tracker when contouring a dark surface can be well under one microwatt. It is important, therefore, to be able to distinguish this significant light from all ambient or stray illumination and thereby prevent the system output from being distorted in the typical factory environment in which rotor blades undergo contour measurement. To this end, the system in accordance with the invention incorporates three distinct kinds of filtering which, taken together, render the electrooptical system substantially immune to stray illumination that would otherwise bias the contour reading.

The first filter is temporal in nature, this being accomplished by a modulator 44 interposed in the optical path between laser 42 and beam expander 43, the beam being modulated at a repetition rate of 1,000 Hz. The tracker output is synchronously demodulated to be optimally sensitive to the modulated incoming flux and to reject the 120 and 60 Hz frequencies commonly encountered in a-c powered factory light sources.

The second filter is spectral in character, in that the illuminator light output is concentrated at a spectral wavelength (0.6328 microns in the case of radiation from a helium-neon laser). The tracker output is correspondingly optically filtered to restrict its response to a narrow bandwidth (i.e., ±0.005 microns in the helicopter rotor contouring system), which encompasses the selected spectral wavelength and rejects other wavelengths. The third filter is spatial, and to this end the tracker is masked to receive radiation only from a field view ±¼ inch around its aim point.

In the present system, the tracker angle used in contour calculation is the algebraic sum of two angles, one being a coarse angle measured electromechanically by scan position encoder 41 over an angular range of ±30° to an accuracy of one second of arc. This measurement may be effected with a commercially-available angle sensor known as an Inductosyn.

The other angle measurement used in contour calculation is a fine angle measurement carried out electro-optically by a fine tracker 45 over an angular range of ±0.1° to an accuracy of one second of arc. This two-stage angle readout for the tracker tolerates leads or lags of several minutes of arc in the tracker's optical axis, making it possible to use a servoed tracker system which can follow an illuminated spot moving at an angular rate of several degrees per second. The fine angle tracker design provides an output voltage proportional to angle error over a field of view of approximately six minutes.

As shown in FIG. 6, the fine angle tracker views the illuminated line-shaped spot on the rotor surface $S_1$ through a lens system comprising a collimating objective lens 46 and a servoed-focusing objective lens 47. A square aperture stop 48 is interposed between these lenses, with one pair of its sides parallel to the line image on the rotor surface. A spectral filter 49 is placed in the optical path behind objective lens 47.

The square aperture stop operates in conjunction with the objective and focusing lenses to generate a square pyramid of light flux in the tracker. This pyramid converges toward a line-shaped apex parallel to the same two sides of the aperture stop, the apex being an image of the laser spot on the rotor surface.

The square pyramid of light is intercepted near its apex by a two-element silicon photodetector 50. The output of detector 50 is fed through preamplifiers 51 and 52 to differential and summing amplifiers 53 and 54 whose algebraically combined output is applied to a ratio circuit 55, the output of which goes to a scaler 56 which yields the fine angle output reading.

The two-element silicon photodetector can be conveniently constructed by connecting appropriate adjacent pairs of elements in a commercially-available quadrant-type fourelement silicon detector. The use of a four-quadrant silicon detector is a preferred design configuration because it makes possible an alternate pairing of adjacent quadrants which facilitates leveling of the illuminator and tracker axes during construction and alignment of the system.

The intersection of the photodetector plane with the flux pyramid is a rectangle of light with an intensity distribution which is bilaterally symmetrical. If the laser line moves off center in the field of view of the tracker, the ratio of the difference divided by the sum of the flux levels intercepted by the two silicon elements of detector 50 is a direct linear measure of the distance of the laser line from the center of the tracker's field of view.

The optical geometry and detector configuration are important elements of the system, for its metrological integrity depends on the feasibility of establishing a stable relationship between the flux difference in the two detectors and the line position.

The advantage of a two-element silicon photodetector lies in the fact that these detectors exhibit responsivities which change only about 0.1%/C°. Moreover, such two-element silicon detector elements have practically identical chemical and physical properties and tend, therefore, to track their cellmates in photodetective responsivity.

In contradistinction, conventional photomultiplier detectors are individually made and exhibit responsivities which change about 1%/C°. Hence it would be difficult to find two individual photomultipliers that match in responsivity over the temperature range normally encountered during the expected lifetime of a contour measuring system of the present type.

The use of two angle measurements combined with one predetermined side length (baseline) enables the triangulation rangefinders I and II to carry out contour measurement relative to the length of the baseline as the single scaling factor. The length of the baseline which extends between the illuminator and tracker pivot points on the supporting beam of the carriage is, of course, affected by the temperature coefficient of the supporting beam and therefore is dependent on temperature. However, the baseline is compact, so that its temperature is relatively uniform, constant and easily monitored.

In a system in accordance with the invention, the contouring speed is fast because of the two-stage track angle readout. This two-stage readout makes feasible an operating speed that is orders of magnitude more rapid than is attainable with a one-stage system. In practice, the use of a twostage tracker, a high intensity laser beam illuminator and state-of-the-art computer technology makes it possible to carry out measurement of a full contour line in less than one minute. During this brief interval, the baseline beam temperature changes less than ±0.1° F. which corresponds to a change in scale factor of less than one part in a million.

Thus the two-stage tracker, the intense laser beam and advanced computer technology taken in conjunction with a monolithic baseline constitute a synergistic combination and makes possible operation in a favorable region of the temporal noise spectrum.

When contouring successive chords of the rotor blade, the triangulation rangefinder assemblies are translated in a step-wise manner by the carriage on which these assemblies are borne relative to the opposing surfaces of the blade. As noted previously, this causes twisting and distortion in the structure supporting the rangefinder assemblies and slightly changes the orientation thereof relative to the surfaces. Since this distortion is corrected by the use of straight calibration bars 16 and 18 mounted independently of the rangefinder assemblies, these bars must be surveyed-in and adjusted for straightness so that they can serve as an invariant reference coordinate system to determine the orientation of the rangefinder assemblies after each step along the length of the blade.

Alternatively, the rangefinder can be rotated on a third Inductosyn-monitored spindle axis which is oriented at right angles to the two parallel pivot axes of the illuminator and the tracker. The use of this third rotary axis substitutes a balanced rotary motion with zero centroid shift for the unbalanced translational motion and it obviates the need for calibration bars.

While there has been shown and described a preferred embodiment of an electro-optical contour measuring system in accordance with the invention, it will be appreciated that many changes and modifications may be made therein without, however, departing from the essential spirit thereof. Thus instead of running the carriage transporting the rangefinder assemblies I and II on ground rails, an overhead rail arrangement for this purpose may be provided.

We claim:

1. A system for accurately and rapidly measuring the surface contour of a shaped object, said system comprising:
    A. a fixture for stably supporting said object with respect to a reference axis extending in a given direction;
    B. a carriage movable in said direction on a track in a straight line path parallel to said reference axis, said carriage having a structural beam which extends at right angles to said axis and faces the surface of the object to be measured;
    C. a triangulation rangefinder assembly borne by said carriage beam and constituted by a pivotally-mounted light beam illuminator and a pivotally-mounted automatic tracker, said illuminator and said tracker being rotatable about spaced pivot points on said carriage beam, the line extending between said pivot points representing a triangulation baseline having a known value;
    D. motor means to advance said carriage in incremental steps along said track from one end of said object to the other; said carriage in the course of its movement along said track being subject to displacements which slightly distort the orientation of the rangefinder relative to the surface of the shaped object being measured;
    E. means to render said assembly operative at each step position of said carriage to cause said illuminator to swing through a sector wherein said light beam impinges on said surface to produce a luminous spot thereon that scans in a path normal to said reference axis from one edge of the object to the other and to cause said tracker in response to the light reflected from said surface to follow said scanning spot;
    F. means operatively associated with said illuminator and tracker to determine the changing angular values assumed by the illuminator and by the tracker in the course of each tracked scan to produce values representative thereof;
    G. calibration means intercepted by said scanning spot and mechanically independent of the carriage for sensing said distortions in the range finder assembly orientation relative to the surface being measured resulting from stepping of said carriage along said track to product correction values therefor; and
    H. a computer having said known baseline value stored therein and responsive to said changing angular values and to said correction values to compute by triangulation the changing position of said spot on said surface in the course of a tracked scan and to thereby provide a contour reading of each scan, whereby the contour of the entire surface is determined upon the completion of carriage advance from one end of the object to the other.

2. A system as set forth in claim 1, wherein said illuminator and said tracker on said carriage beam have counter-balanced structures to maintain fixed centroids, whereby rotation of the illuminator and tracker on the carriage beam does not give rise to shifting masses tending to displace the carriage.

3. A system as set forth in claim 1, wherein said light beam is generated by a laser beam source.

4. A system as set forth in claim 3, wherein said laser beam is modulated at a rapid periodic rate and the tracker output is synchronously demodulated to effect rejection of stray light having a much lower periodic rate from sources other than said laser beam source.

5. A system as set forth in claim 3, wherein the light output of said illuminator is concentrated at a predetermined spectral wavelength and the output of said tracker is narrow-band filtered to limit its effective response to effect rejection of stray light.

6. A system as set forth in claim 3, wherein said laser beam creates on said surface a spot having a line formation whose dimensions are about $0.001 \times 0.100$ inches, the line being parallel to the longitudinal axis of said object, whereby the spot may be used to effectively scan rough surfaces.

7. A system as set forth in claim 1, wherein said object is a helicopter blade which is held lengthwise in said fixture, the illuminator scanning the surface along a chord of the blade from the leading to the trailing edge thereof.

8. A system as set forth in claim 7, wherein said fixture includes a series of spaced uprights, each having upper and lower cantilever arms between which said blade is held by means engaging the leading and trailing edges thereof.

9. A system as set forth in claim 8, further including a mirror optically associated with said rangefinder assembly and placed below said leading edge, the mirror orientation being such that the reflection of the illuminator incident on the leading edge of the blade surface is directed by the mirror toward said tracker.

10. A system as set forth in claim 7, further including a second rangefinder assembly mounted on a second carriage beam for concurrently scanning the opposite surface of said blade to effect contour measurement thereof.

11. A system as set forth in claim 8, wherein said calibration means is constituted by straight calibration bars mounted on said fixture above and below the leading and trailing edges of said blade, whereby by scanning the bars at each step position, corrections can be made for distortions in the rangefinder assembly orientation relative to the surface being measured resulting from stepping of the carriage along said track.

12. A system as set forth in claim 8, wherein said carriage track is constituted by rails placed on either side of said fixture and having a length extending beyond the blade at either end thereof whereby said blade may be replaced without difficulty.

* * * * *